United States Patent Office 3,071,484
Patented Jan. 1, 1963

3,071,484
NONPIGMENTED CELLULOSE ETHER COATING COMPOSITION AND PROCESS
Victor J. Larson, Wilmington, Del., assignor to Hercules Powder Company, Wilmington, Del., a corporation of Delaware
No Drawing. Filed Apr. 10, 1959, Ser. No. 805,376
20 Claims. (Cl. 106—172)

The present invention relates to new and improved coating compositions and process of making, and more particularly to such compositions and process wherein cellulose ethers are employed as flatting agents to produce substantially transparent films of any desired degree of gloss.

Heretofore flat or semigloss finishes have been obtained by rubbing with rubbing compounds by hand or machine or using flatting agents such as metal salts of fatty acids which are often called metallic soaps (e.g. aluminum, magnesimum, calcium or zinc stearates or palmitates), or inert or extender-type pigments (e.g. silica, magnesium silicate, china clay). A métallic soap and an inert pigment have been used alone and in combination as flatting agents in the prior art.

A number of drawbacks are inherent in the above-described prior art practice. The use of metallic soaps tends to produce films which are soft and "cheesy," whereas the use of flatting pigments often gives a film having a muddy appearance, especially when coating dark-stained woods such as mahogany and walnut. Another drawback to the prior art practice is that the soaps and pigments must be ground very carefully in order to avoid scouring or discoloration before adding them to film-forming vehicles such as varnishes, alkyd resins, hard resin solutions, or mixtures thereof. A further drawback of the prior art practice is that the flatting bases tend to settle on standing and therefore must be stirred frequently while being used in order to obtain a uniform and proper degree of gloss.

An objective of the present invention is new and improved coating compositions and process of making same. Another objective is to provide a process of preparing coating compositions which dry to a transparent dull or matte finish. A further objective is to provide such a process wherein a novel flatting agent is employed. A still further objective is to provide such a process whereby in the grinding of the flatting agent is eliminated. The above and other objectives will be apparent from the description of this invention given hereinafter.

I have found that the above drawbacks can be eliminated and the above objectives accomplished by employing cellulose ethers as flatting agents in preparing coating compositions that dry to a substantially dull or matte finish, which process comprises dispersing the cellulose ether in a carrier therefor, e.g. an unbodied drying oil, thinning the cellulose ether dispersion to the desired nonvolatile content by adding thereto at least a petroleum aliphatic naphtha, adding to the resulting mixture a normally glossy-drying, nonaqueous, organic, film-forming vehicle consisting of varnishes, alkyds and hard resin solutions or mixtures thereof, the cellulose ethers being selected from the group consisting of ethyl hydroxyethyl cellulose and ethyl cellulose.

I have found that before the cellulose ether can be mixed with the film-forming vehicle and serve properly as a flatting agent, the cellulose ether must be incorporated in some sort of carrier therefor. Preparing a colloidal dispersion of the cellulose ether in an unbodied drying oil serves this purpose well. Then the cellulose ether dispersion is thinned to the desired nonvolatile content with either a petroleum aliphatic naphtha or said naphtha plus an aromatic hydrocarbon. The film-forming vehicle next is incorporated in the resulting mixture.

The cellulose ether dispersion may be prepared either at room temperature or an elevated temperature, the latter being preferred. However, if room temperature is used, it is necessary to thin the cellulose ether dispersion with both a petroleum aliphatic naphtha and an aromatic hydrocarbon. In any event the thinner must be a solvent for the film-former employed.

One means of carrying out this invention according to a preferred embodiment thereof comprises heating an unbodied drying oil to a temperature of approximately 450° F., adding a low-viscosity cellulose ether slowly to the hot oil with agitation, maintaining the temperature of the mixture between about 430° F.–460° F. and continuing to agitate until the dispersion is substantially complete. This usually requires about 15 minutes after completing the addition of the cellulose ether and is indicated by forming a clear pill when a drop of the dispersion is placed on a cold glass plate. When the preparation of the cellulose ether dispersion has been completed, it is thinned to the desired nonvolatile content by adding to it a petroleum aliphatic naphtha, e.g. mineral spirits, and preferably the resulting mixture is screened as through a cheese cloth. This mixture is incorporated into the desired vehicle film-former, e.g. a varnish, alkyd, hard resin solution, or mixtures thereof, either with or without driers and other additives. The resulting coating is brushed, sprayed or otherwise applied to a surface and dried either at room temperature or elevated temperature to give a film of any desired degree of gloss.

Thus the present invention provides an accurate and efficient means of producing coating compositions which dry to films having any desired degree of gloss or flatness. As will be shown more fully hereinafter, the degree of gloss is dependent on a number of factors including the cellulose ether/oil ratio in the dispersion, concentration of the cellulose ether-oil dispersion in the final coating composition, the solvent employed, and also the film-forming vehicle employed.

The following examples illustrate the invention, but they are not intended to limit it. In the examples percent and parts are by weight. The kauri-butanol (KB) solvency values disclosed in this application were determined by employing the method of ASTM Specification Number D1133–54T. All gloss readings disclosed herein were obtained with a 60° photovolt glossmeter.

EXAMPLE 1—FLAT VARNISH

*Preparation of EHEC Flatting Base No. 1*

100 parts of alkali refined linseed oil was heated to 450° F. 40 parts of low-viscosity EHEC was slowly added to the oil while agitating and maintaining the temperature of the mixture between 430° F.–460° F. Agitation was continued and the temperature of the mixture kept within this range for about 15 minutes after completing the addition of EHEC. This gave a colloidal dispersion of the EHEC in the oil and the fact that a drop of the dispersion on a cold plate glass was clear indicated that the dispersion was substantially complete. The resulting dispersion was thinned to a 25% nonvolatile content by mixing in 420 parts of mineral spirits having a KB of 36–38.

*Incorporation of Film-Forming Vehicle With Flatting Base*

Portions of the above EHEC flatting base No. 1 were then used to prepare 4 samples of flat varnishes by adding thereto hard resin solutions and drier as shown in Table 1 below.

When brushed onto sealed wood panels, all 4 samples dried at room temperature conditions in less than 16 hours to flat films, which were quite satisfactory from the standpoint of flatness according to this invention.

Judged from the standpoint of desired degree of hardness, film C was the best, films A and B were slightly brittle and film D was slightly soft. It will be noted that films A and B contained almost double the amount of resin solution in film C and that film D contained no resin solution but only EHEC flatting base and drier.

TABLE 1

| Film | A | B | C | D |
|---|---|---|---|---|
| Ingredient: | Parts | Parts | Parts | Parts |
| EHEC flatting base No. 1 (25% NV in MS) | 100 | 100 | 100 | 100 |
| Pentalyn A-60M (60% NV in MS) | 50 | | | |
| Pentalyn K-50M (50% NV in MS) | | 60 | 30 | |
| 6% Cobalt naphthenate drier | .35 | .35 | .35 | .35 |

NV means Nonvolatile.
MS means Mineral Spirits having a KB of 36–38.

EXAMPLE 2—FLAT VARNISH

Preparation of EHEC Flatting Base No. 2

Using the same procedure as used in Example 1 for preparing flatting base No. 1, flatting base No. 2 was prepared with 100 parts alkali refined linseed oil, 100 parts of low-viscosity EHEC, and 600 parts mineral spirits having a KB of 36–38.

Incorporating Film-Forming Vehicle With Flatting Base

The above EHEC flatting base No. 2 was then used to prepare a flat varnish by adding thereto a varnish and drier as shown in Table 2 below.

When brushed on sealed wood panels, the varnish dried to a hard, "rubbed-effect" finish at room temperature with a gloss reading of 15.

TABLE 2

| Ingredient: | Parts |
|---|---|
| EHEC flatting base No. 2 (25% NV in MS) | 200 |
| 25 gallon phenolic resin[1]-tung oil varnish (50% NV in MS)[2] | 200 |
| 6% cobalt naphthenate drier | 0.4 |

[1] Ester gum modified phenolic resin.
[2] Contained drier (0.5% lead, 0.05% cobalt, 0.05% manganese as metals based on tung oil).

EXAMPLE 3—FLAT VARNISH

This example was identical to Example 2 except that instead of the regular mineral spirits having a KB of 36–38 used in Example 2, odorless mineral spirits having a KB of 26 was used to prepare EHEC flatting base No. 3.

When brushed on sealed wood panels, the varnish dried at room temperature to a hard, "rubbed-effect" finish having a gloss reading of 25.

EXAMPLE 4—FLAT ALKYD

Incorporating Film-Forming Vehicle With Flatting Base

EHEC flatting base No. 2 was used to prepare a flat alkyl by adding the alkyd and drier as shown in Table 3 below.

When brushed on sealed wood panels the resulting alkyd coating composition dried at room temperature to a hard, flat finish having a gloss reading of zero.

TABLE 3

| Ingredient: | Parts |
|---|---|
| EHEC flatting base No. 2 (25% NV in MS) | 160 |
| 60% TOFA[1]–PE[2] alkyd (50% NV in MS)[3] | 80 |
| 6% cobalt naphthenate drier | 0.3 |

[1] Tall oil fatty acid—low rosin content, i.e. about 1%–4% rosin.
[2] Pentaerythritol.
[3] Contained drier (0.5% lead, 0.07% cobalt, 0.10% calcium as metals based on NV of TOFA–PE alkyd).

EXAMPLE 5

Preparation of EHEC Flatting Base No. 4

EHEC flatting base No. 4 was prepared using the same procedure as for Example 1 using 100 parts dehydrated castor oil having a Gardner-Holdt viscosity of G–H, 100 parts low viscosity EHEC and 400 parts mineral spirits having a KB of 36–38 to give a nonvolatile content of 33⅓%.

Preparation of Films From Above Flatting Base No. 4

The resulting flatting base was divided into 4 portions to which various amounts of toluene were added to vary the KB value. The resulting mixtures were brushed onto sealed wood panels, allowed to dry at room temperature and the films examined for degree of gloss. Further details are given in Table 4 below.

TABLE 4

| Film | A | B | C | D |
|---|---|---|---|---|
| Ingredient and Properties: | | | | |
| EHEC flatting base No. 4 parts | 60 | 60 | 60 | 60 |
| Toluene (KB 100) do | | 10 | 20 | 30 |
| KB of Solvent Blend do | 38 | 48 | 55 | 61 |
| Film appearance | flat | flat | semiflat | gloss |
| Gloss Reading parts | 4 | 6 | 23 | 70 |

EXAMPLE 6

Preparation of EHEC Flatting Base No. 5

30 parts of dehydrated castor oil having a Gardner-Holdt viscosity of G–H, 144 parts mineral spirits solvent having a KB of 36–38, and 36 parts Solvesso 100 solvent having a KB of 90 were thoroughly mixed by rapid agitation at room temperature. 30 parts of low viscosity EHEC was slowly added and the agitation was continued about 1½ hours until substantially all of the EHEC had become dispersed in the mixture of oil and solvents. The mixed solvents had a KB of 48.

Preparation of Films From Above Flatting Base No. 5

When applied to sealed wood test panels and allowed to dry at room temperature, the above flattening base No. 5 gave films having a gloss reading of 5.

EXAMPLE 7

Mixed Varnish—Alkyd Vehicle

A coating composition was prepared by mixing together 100 parts of the phenolic-tung oil varnish of Example 2 (50% NV in MS), 100 parts of the TOFA-PE alkyd of Example 4 (50% NV in MS), 200 parts EHEC flatting base No. 2 (25% NV) and 0.4 part 6% cobalt naphthenate drier. Mineral spirits having a KB of 36–38 was used as the solvent.

When applied to sealed wood test panels and allowed to dry at room temperature, the above coating composition gave films having a gloss reading of 10.

EXAMPLE 8

Mixed Resin Solution—Alkyd Vehicle

A coating composition was prepared by mixing together 100 parts of the TOFA-PE alkyd of Example 4 (50% NV in MS), 15 parts Cellolyn 102 hard resin solution (60% NV in toluene), 230 parts EHEC flatting base No. 2 (25% NV in MS) and 0.4 part 6% cobalt naphthenate drier. The mixed solvents had a KB of 41.

When applied to sealed wood test panels and allowed to dry at room temperature, the above coating composition gave films having a gloss reading of zero.

EXAMPLE 9—HIGH RATIO OF EHEC TO OIL

Preparation of EHEC Flatting Base No. 6

EHEC flatting base No. 6 was prepared using the same procedure as for Example 1 using 100 parts alkali refined linseed oil, 200 parts low viscosity EHEC and 1200 parts mineral spirits having a KB of 36–38 to give a 20% nonvolatile content.

*Preparation of Films From Above Flatting Base No. 6*

When applied to sealed wood test panels and allowed to dry at room temperature, the above flatting base No. 6 gave films having a gloss reading of 25.

EXAMPLE 10—EXTRA LOW VISCOSITY EHEC

*Preparation of EHEC Flatting Bases Nos. 7–12*

EHEC flatting bases Nos. 7 and 8 were prepared using the same procedure as for Example 1 using 100 parts dehydrated castor oil having a Gardner-Holdt viscosity of G–H and 100 parts extra low viscosity EHEC. The resulting mixture was divided into two portions and these were used to prepare two separate mixtures having nonvolatile contents of 20% and 30% by adding to each portion the appropriate amount of mineral spirits having a KB of 36–38. The above procedure was repeated to prepare EHEC flatting bases Nos. 9 and 10 except low viscosity EHEC was used. The viscosities of these flatting bases are given in Table 5 below for comparison.

When applied to sealed wood test panels and allowed to dry at room temperature, the above flatting bases gave films having a gloss reading of 5.

TABLE 5

| Flatting Base No. | 7 | 8 | 9 | 10 |
|---|---|---|---|---|
| Percent Nonvolatile content | 20 | 30 | 20 | 30 |
| Extra low viscosity EHEC—Viscosity of flatting base (cps.) | 220 | 1,600 | | |
| Low Viscosity EHEC—Viscosity of flatting base (cps.) | | | 520 | 5,800 |

EXAMPLE 11—ETHYL CELLULOSE

*Preparation of Ethyl Cellulose Flatting Base No. 13*

Using the same procedure as used in Example 1 for preparing flatting base No. 1, flatting base No. 13 was prepared with 100 parts dehydrated castor oil having a Gardner-Holdt viscosity of G–H, 100 parts of T–10 ethyl cellulose and 600 parts mineral spirits having a KB of 36–38 to give a nonvolatile content of 25% and a Brookfield viscosity of 3.8 poises.

*Preparation of EHEC Flatting Base No. 14*

This wsa prepared exactly the same as flatting base No. 13 above, except that low viscosity EHEC was used instead of the ethyl cellulose, and the Brookfield viscosity was 76.0 poises.

*Preparation of Films From Above Flatting Bases Nos. 13 and 14*

When applied to sealed wood test panels and allowed to dry at room temperature, the above flatting bases Nos. 13 and 14 gave films having gloss readings of 47 and 3, respectively.

The above examples illustrate specific embodiments of this invention, many modifications of which may be made therein within the scope of the invention.

As shown in the above examples, the flatting base may be prepared either at elevated temperature or at room temperature. Preparation without using heat requires a mixture of solvents and for best results longer and more efficient agitation. The temperature of the cellulose ether carrier during incorporation of the cellulose ether therein may vary from about 430° F.–460° F. At temperatures above 460° F. the cellulose ether is apt to be degraded. Temperatures below 430° F. can be used if one wishes to tolerate the increased time necessary to disperse the cellulose ether in the carrier.

Any degree of flatness or gloss desired in films made according to this invention can be obtained by varying (1) the cellulose ether/oil ratio in the flatting base, (2) concentration of the cellulose ether-oil dispersion in the final coating composition, (3) the KB solvency value of the thinner used, and (4) also the particular film-forming vehicle employed. The amount of the cellulose ether which may be used in the flatting base may be expressed as cellulose/ether ratio and although this ratio can vary from 40/100–200/100, preferably this ratio will fall within the range of 40/100–100/100. The amount of the cellulose ether flatting base can be varied from about 15% to 100% by weight based on the solids content of the coating composition. Less than 15% tends to be unstable on standing. The KB solvency value should not exceed about 60, because if one exceeds this value it will produce glossy films in most cases.

I have found that I must use a carrier for the cellulose ether in order to realize the benefits of this invention; that is, I have not been able to incorporate the cellulose ether directly into the system but must first add the cellulose ether to a carrier therefor and incorporate the resulting mixture into the coating composition. Various carriers are suitable. Very good results can be obtained with, for example, unbodied drying oils, including by way of illustration and not limitation, linseed oil, soybean oil and fish oil, dehydrated castor oil having a Gardner-Holdt viscosity of G–H, and tung oil.

Throughout the specification and claims of the present application I have used the terms "dispersion" and "colloidal dispersion" with reference to incorporating the cellulose ether in a carrier therefor and the state of the cellulose ether in the final coating composition. By this terminology I mean a substantially uniform distribution of the cellulose ether in the carrier and also of the cellulose ether in the final coating composition. Probably some of the cellulose ether is in suspension and a small amount may even be in solution, but to the eye the cellulose ether appears to be colloidally dispersed.

The viscosity of the cellulose ether is not critical but it is significant from a practical standpoint. At present EHEC is commercially available in three viscosity types; namely, extra low, 10–19 cps.; low, 20–35 cps.; and high, 125–250 cps. Low viscosity EHEC is preferred in this invention. Normally, for practical reasons in handling, in most instances one will not use the high viscosity EHEC in practicing this invention. The preferred viscosity ethyl cellulose is that commercially available as the T–10 type; it has a viscosity of 8–11 cps. These viscosities are conventionally measured on a 5% solution in 80:20 toluene:ethanol by weight at 25° C.

Any film-forming vehicle, consisting of varnishes, alkyds, hard resin solutions, or mixtures thereof may be used in this invention. The present invention is applicable to any varnish, the processes for making same being well known in the art. Varnish can vary in oil length from 1 to 100 gallons depending on the final properties desired. Likewise, the invention is useful with any alkyd, typical examples of which are those that pass Federal Specification TTR–26a, Types I and III. Instead of the tall oil fatty acid given in the examples, I may use any vegetable or marine-type unsaturated fatty acid.

The particular vehicles employed in the examples may be further defined as follows. Pentalyn A 60M is a hard resin solution of 60% pentaerythritol ester of wood rosin thinned with 40% mineral spirits having a KB solvency value of 36–38, and this Pentalyn solution has a Gardner-Holdt viscosity of E–H. Pentalyn K 50M is a hard resin solution of 50% pentaerythritol ester of a modified wood rosin thinned with 50% mineral spirits having a KB solvency value of 36–38, and this Pentalyn solution has a Gardner-Holdt viscosity of T–X. Cellolyn 102 is a particular hard resin solution of pentaerythritol ester of a modified wood rosin. Cellolyn 102 is further defined in U.S. Patents 2,536,090 and 2,536,658. Examples of other applicable hard resin solutions include glycerol ester gum, maleic ester gum, phenolic modified ester gums. Varnishes made from typical phenolic modified ester gums include the following: Amberol F–7, Pentalyn 802A, Beckacite 1126, and Plaskon 3401. Nonheat hardening or pure phenolics are also applicable. The above and other similar resins are well known in the art, and they are listed for convenient reference in the Raw Materials Index, Resin Section, published by National Paint, Varnish & Lacquer Association, Washington, D.C. This publication has no particular date of publication since it is a loose-leaf booklet kept up to date by revising one or more pages whenever necessary and each page bears the date when last revised. The disclosure of film forming vehicles given herein are exemplary only and are not intended to limit the invention.

As pointed out previously, these film-forming vehicles must be soluble in the solvents disclosed herein.

Another important advantage of this invention is that it substantially eliminates settling and therefore contributes to more uniform coatings. The cellulose ether-oil dispersion makes the coating compositions somewhat thixotropic which reduces settling and improves application characteristics. Prevention or minimizing of settling also makes it possible to obtain a coating of the desired gloss without stirring the coating composition, or at most only very infrequent stirring during application of the coating. Settling of flat and semi-gloss clear finishes during storage is a serious problem in the prior art.

As many apparent and widely different embodiments of this invention may be made without departing from the spirit and scope thereof, it is to be understood that I do not limit myself to the specific embodiments thereof except as defined in the appended claims.

What I claim and desire to protect by Letters Patent is:

1. A coating composition which dries to a transparent dull or matte finish, which consists essentially of a normally glossy drying nonaqueous organic film-forming vehicle consisting of oleoresinous varnishes, oil-modified phthalic esters, spirit varnishes, and mixtures thereof, at least a petroleum aliphatic naphtha solvent for said vehicle having a kauri-butanol solvency value not in excess of about 60, a cellulose ether selected from the group consisting of ethyl hydroxyethyl cellulose and ethyl cellulose, and an unbodied drying oil as a carrier for said cellulose ether, the cellulose ether/carrier ratio being 40/100–200/100, the total combined amount of cellulose ether, carrier and solvent being about 15%–100% by weight based on the solids content of said coating composition.

2. Process of preparing a coating composition which dries to a substantially transparent dull or matte finish, which comprises heating to about 430° F.–460° F. an unbodied drying oil as a carrier for a cellulose ether selected from the group consisting of ethyl hydroxyethyl cellulose and ethyl cellulose, dispersing the cellulose ether in the heated carrier while agitating and maintaining at a temperature of about 430° F.–460° F. until all of the cellulose ether has been added and substantially completely dispersed in the carrier, thinning the cellulose ether dispersion to the desired nonvolatile content by adding thereto a petroleum aliphatic naphtha having a kauri-butanol solvency value not in excess of about 60, and adding to the resulting mixture a normally glossy drying nonaqueous organic film-forming vehicle consisting of oleoresinous varnishes, oil-modified phthalic esters, spirit varnishes, and mixtures thereof, the petroleum aliphatic naphtha being a solvent for all film-forming vehicles employed, the cellulose ether/carrier ratio being 40/100–200/100, the total combined amount of cellulose ether, carrier and solvent being about 15%–100% by weight based on the solids content of said coating composition.

3. Process of preparing a coating composition which dries to a substantially transparent dull or matte finish, which comprises dispersing a cellulose ether in an unbodied drying oil as a carrier therefor at about room temperature while agitating, thinning the cellulose ether dispersion to the desired nonvolatile content by adding thereto a petroleum aliphatic naphtha solvent and an aromatic hydrocarbon solvent, the solvents having a combined kauri-butanol solvency value not in excess of about 60, and adding to the resulting mixture a normally glossy drying nonaqueous organic film-forming vehicle consisting of oleoresinous varnishes, oil-modified phthalic esters, spirit varnishes, and mixtures thereof, the solvent mixture being a solvent for all film-forming vehicles employed, and the cellulose ether being selected from the group consisting of ethyl hydroxyethyl cellulose and ethyl cellulose, the cellulose ether/carrier ratio being 40/100–200/100, the total combined amount of cellulose ether, carrier and solvent being about 15%–100% by weight based on the solids content of said coating composition.

4. Process of preparing a coating composition which dries to a substantially transparent dull or matte finish, which comprises heating an unbodied drying oil to about 430° F.–460° F., dispersing ethyl hydroxyethyl cellulose in the heated unbodied drying oil while agitating and maintaining at a temperature of about 430° F.–460° F. until all of the ethyl hydroxyethyl cellulose has been added and substantially completely dispersed in the oil, thinning the ethyl hydroxyethyl cellulose dispersion to the desired nonvolatile content by adding thereto a petroleum aliphatic naphtha having a kauri-butanol solvency value not in excess of about 60, and adding to the resulting mixture a normally glossy drying oleoresinous varnish, the naphtha being a solvent for the oleoresinous varnish, the ethyl hydroxyethyl cellulose/oil ratio being 40/100–200/100, the total combined amount of ethyl hydroxyethyl cellulose, oil and solvent being about 15%–100% by weight based on the solids content of said coating composition.

5. Process of claim 4 wherein ethyl cellulose is substituted for the ethyl hydroxyethyl cellulose.

6. Process of preparing a coating composition which dries to a substantially transparent dull or matte finish, which comprises heating an unbodied drying oil to about 430° F.–460° F., dispersing ethyl hydroxyethyl cellulose in the heated unbodied drying oil while agitating and maintaining at a temperature of about 430° F.–460° F. until all of the ethyl hydroxyethyl cellulose has been added and substantially completely dispersed in the oil, thinning the ethyl hydroxyethyl cellulose dispersion to the desired nonvolatile content by adding thereto a petroleum aliphatic naphtha having a kauri-butanol solvency value not in excess of about 60, and adding to the resulting mixture a normally glossy drying oil-modified phthalic ester, the naphtha being a solvent for the oil-modified phthalic ester, the ethyl hydroxyethyl cellulose/oil ratio being 40/100–200/100, the total combined amount of ethyl hydroxyethyl cellulose, oil and solvent being about 15%–100% by weight based on the solids content of said coating composition.

7. Process of claim 6 wherein ethyl cellulose is substituted for the ethyl hydroxyethyl cellulose.

8. Process of preparing a coating composition which dries to a substantially transparent dull or matte finish, which comprises heating an unbodied drying oil to about 430° F.–460° F., dispersing ethyl hydroxyethyl cellulose in the heated unbodied drying oil while agitating and maintaining at a temperature of about 430° F.–460° F. until all of the ethyl hydroxyethyl cellulose has been added and substantially completely dispersed in the oil, thinning the ethyl hydroxyethyl cellulose dispersion to the desired nonvolatile content by adding thereto a petroleum aliphatic naphtha having a kauri-butanol solvency value not in excess of about 60, and adding to the resulting mixture a normally glossy drying spirit varnish, the petroleum naphtha being a solvent for the spirit varnish, the ethyl hydroxyethyl cellulose/oil ratio being 40/100–200/100, the total combined amount of ethyl hydroxyethyl cellulose, oil and solvent being about 15%–100% by weight based on the solids content of said coating composition.

9. Process of claim 8 wherein ethyl cellulose is substituted for the ethyl hydroxyethyl cellulose.

10. A coating composition which dries to a transparent dull or matte finish, which consists essentially of a normally glossy drying nonaqueous organic film-forming vehicle consisting of oleoresinous varnishes, oil-modified phthalic esters, spirit varnishes, and mixtures thereof, a petroleum aliphatic naphtha solvent for said vehicle, the solvent having a kauri-butanol value not in excess of about 60, an unbodied drying oil, and ethyl hydroxyethyl cellulose uniformly distributed throughout the coating composition, the ethyl hydroxyethyl cellulose/oil ratio being 40/100–200/100, the total combined amount of ethyl hydroxyethyl cellulose, oil and solvent being about 15%–100% by weight based on the solids content of said coating composition.

11. The coating composition of claim 10 wherein ethyl cellulose is substituted for the ethyl hydroxyethyl cellulose.

12. A coating composition which dries to a transparent dull or matte finish, which consists essentially of a normally glossy drying nonaqueous organic film-forming vehicle consisting of oleoresinous varnishes, oil-modified phthalic esters, spirit varnishes, and mixtures thereof, a petroleum aliphatic naphtha and an aromatic hydrocarbon which are solvents for said vehicle, the solvents having in combination a kauri-butanol value not in excess of about 60, an unbodied drying oil, and ethyl hydroxyethyl cellulose uniformly distributed throughout the coating composition, the ethyl hydroxyethyl cellulose/oil ratio being 40/100–200/100, the total combined amount of ethyl hydroxyethyl cellulose, oil and solvent being about 15%–100% by weight based on the solids content of said coating composition.

13. The coating composition of claim 12 wherein ethyl cellulose is substituted for the ethyl hydroxyethyl cellulose.

14. A coating composition which dries to a transparent dull or matte finish, which consists essentially of a normally glossy drying oleoresinous varnish, a petroleum aliphatic naphtha solvent for the oleoresinous varnish, the solvent having a kauri-butanol value not in excess of about 60, an unbodied drying oil, and ethyl hydroxyethyl cellulose uniformly distributed throughout the coating composition, the ethyl hydroxyethyl cellulose/oil ratio being 40/100–200/100, the total combined amount of ethyl hydroxyethyl cellulose, oil and solvent being about 15%–100% by weight based on the solids content of said coating composition.

15. The coating composition of claim 14 wherein ethyl cellulose is substituted for the ethyl hydroxyethyl cellulose.

16. A coating composition which dries to a transparent dull or matte finish, which consists essentially of a normally glossy drying oil-modified phthalic ester, a petroleum aliphatic naphtha solvent for the oil-modified phthalic ester, the solvent having a kauri-butanol value not in excess of about 60, an unbodied drying oil and ethyl hydroxyethyl cellulose uniformly distributed throughout the coating composition, the ethyl hydroxyethyl cellulose/oil ratio being 40/100–200/100, the total combined amount of ethyl hydroxyethyl cellulose, oil and solvent being about 15%–100% by weight based on the solids content of said coating composition.

17. The coating composition of claim 16 wherein ethyl cellulose is substituted for the ethyl hydroxyethyl cellulose.

18. A coating composition which dries to a transparent dull or matte finish, which consists essentially of a normally glossy drying resin solution, a petroleum aliphatic naphtha solvent for the spirit-varnish, the solvent having a kauri-butanol value not in excess of about 60, an unbodied drying oil, and ethyl hydroxyethyl cellulose uniformly distributed throughout the coating composition, the ethyl hydroxyethyl cellulose/oil ratio being 40/100–200/100, the total combined amount of ethyl hydroxyethyl cellulose, oil and solvent being about 15%–100% by weight based on the solids content of said coating composition.

19. The coating composition of claim 18 wherein ethyl cellulose is substituted for the ethyl hydroxyethyl cellulose.

20. Process of preparing a coating composition which dries to a substantially transparent dull or matte finish, which comprises dispersing in an unbodied drying oil as a carrier a cellulose ether selected from the group consisting of ethyl hydroxyethyl cellulose and ethyl cellulose, thinning the cellulose ether dispersion to the desired non-volatile content by adding thereto at least one of a petroleum aliphatic naphtha solvent and an aromatic hydrocarbon solvent, the solvents having a combined kauri-butanol solvency value not in excess of about 60, both of said solvents being used when the temperature used during the preparation of said dispersion and during thinning is about room temperature and only said petroleum aliphatic naphtha being used when said temperature is about 430° F.–460° F., and adding to the resulting mixture a normally glossy drying nonaqueous organic film-forming vehicle consisting of oleoresinous varnishes, oil-modified phthalic esters, spirit varnishes, and mixtures thereof, both of said solvents being solvents for all film-forming vehicles employed, the cellulose ether/carrier ratio being 40/100–200/100, the total combined amount of cellulose ether, carrier and solvent being about 15%–100% by weight based on the solids content of said coating composition.

References Cited in the file of this patent

UNITED STATES PATENTS

| | | |
|---|---|---|
| 2,148,601 | Bucy | Feb. 28, 1939 |
| 2,252,521 | Peterson et al. | Aug. 12, 1941 |
| 2,362,876 | Balassa | Nov. 14, 1944 |
| 2,684,915 | Tinsley | July 27, 1954 |
| 2,717,214 | Marotta et al. | Sept. 6, 1955 |

FOREIGN PATENTS

| | | |
|---|---|---|
| 483,727 | Canada | June 3, 1952 |

OTHER REFERENCES

National Paint Dictionary (1948), page 600.

UNITED STATES PATENT OFFICE
CERTIFICATE OF CORRECTION

Patent No. 3,071,484            January 1, 1963

Victor J. Larson

It is hereby certified that error appears in the above numbered patent requiring correction and that the said Letters Patent should read as corrected below.

Column 1, line 20, for "magnesimum" read -- magnesium --; column 4, line 39, for "flattening" read -- flatting --; column 6, line 3, for "cellulose/ether ratio" read -- cellulose ether/oil ratio --.

Signed and sealed this 2nd day of July 1963.

(SEAL)
Attest:

ERNEST W. SWIDER
Attesting Officer

DAVID L. LADD
Commissioner of Patents